US009446472B2

United States Patent
Winn et al.

(10) Patent No.: US 9,446,472 B2
(45) Date of Patent: Sep. 20, 2016

(54) SYSTEM AND METHOD FOR INTEGRATED CONTROLLER

(71) Applicant: LINCOLN GLOBAL, INC., City of Industry, CA (US)

(72) Inventors: Jackie Winn, Mount Pleasant, SC (US); Mark Osowski, City of Industry, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 58 days.

(21) Appl. No.: 14/307,671

(22) Filed: Jun. 18, 2014

(65) Prior Publication Data

US 2015/0251267 A1 Sep. 10, 2015

Related U.S. Application Data

(60) Provisional application No. 61/948,332, filed on Mar. 5, 2014.

(51) Int. Cl.

| | |
|---|---|
| *B23K 10/00* | (2006.01) |
| *B26D 7/00* | (2006.01) |
| *B23K 26/38* | (2014.01) |
| *B23C 1/00* | (2006.01) |
| *B23K 37/02* | (2006.01) |
| *B23K 37/04* | (2006.01) |
| *B23K 26/08* | (2014.01) |
| *B23K 26/14* | (2014.01) |
| *B26F 3/00* | (2006.01) |

(52) U.S. Cl.
CPC .............. *B23K 10/00* (2013.01); *B23C 1/002* (2013.01); *B23K 10/006* (2013.01); *B23K 26/0884* (2013.01); *B23K 26/1435* (2013.01); *B23K 26/1436* (2015.10); *B23K 26/38* (2013.01); *B23K 37/0235* (2013.01); *B23K 37/0461* (2013.01); *B26D 7/0006* (2013.01); *B26F 3/004* (2013.01); *Y10T 83/162* (2015.04); *Y10T 409/30084* (2015.01)

(58) Field of Classification Search
CPC .. B23K 10/00; B23K 26/38; B23K 37/0235; B23K 37/0461; B23K 26/0084; B23K 26/1435; B23K 26/1436; B23D 7/0006; B23C 1/002; Y10T 83/162; H05H 1/26; H05H 1/36; B26F 3/004
USPC ............ 219/121.39, 121.45, 121.67, 121.56, 219/121.48, 121.44, 121.58, 121.54, 219/121.55, 121.59
See application file for complete search history.

(56) References Cited

U.S. PATENT DOCUMENTS

| | | |
|---|---|---|
| 5,844,196 A | 12/1998 | Oakley |
| 6,359,251 B1 | 3/2002 | Picard et al. |
| 6,745,454 B1 * | 6/2004 | Grimshaw ............. B23Q 41/00 198/346.1 |
| 7,709,765 B2 | 5/2010 | Picard et al. |
| 8,395,074 B2 | 3/2013 | Winn et al. |
| 2005/0035093 A1 * | 2/2005 | Yamaguchi .......... B23K 10/006 219/121.39 |

(Continued)

*Primary Examiner* — Mark Paschall
(74) *Attorney, Agent, or Firm* — Perkins Coie LLP

(57) ABSTRACT

The invention described herein generally pertains to a system and method related to integrating cutting or marking operation parameters and motion parameters. A controller is provided that manages both process related control and motion related controls rather than having separate controllers with respective connectivity. The controller provides integrated process related control and motion related control which directly controls a cutting or marking operation with improved dynamics while minimizing connectivity and data communications.

21 Claims, 10 Drawing Sheets

(56) References Cited

U.S. PATENT DOCUMENTS

| | | | | |
|---|---|---|---|---|
| 2007/0241083 A1* | 10/2007 | Yamaguchi | B23K 10/006 | 219/121.39 |
| 2009/0312862 A1* | 12/2009 | Fagan | B23K 10/006 | 700/160 |
| 2010/0301020 A1* | 12/2010 | Phillip | B23K 10/00 | 219/121.44 |
| 2013/0098884 A1 | 4/2013 | Shipulski et al. | | |
| 2014/0061170 A1 | 3/2014 | Lindsay et al. | | |
| 2015/0127137 A1* | 5/2015 | Brandt | B23K 5/00 | 700/166 |
| 2015/0231724 A1* | 8/2015 | Williams | B23K 7/10 | 266/58 |
| 2015/0239059 A1* | 8/2015 | Myers | B23K 26/702 | 219/121.44 |

* cited by examiner

SYSTEM AND METHOD FOR INTEGRATED CONTROLLER

PRIORITY

This application claims the benefit of priority to U.S. Provisional Application Ser. No. 61/948,332, filed Mar. 5, 2014, and entitled "SYSTEM AND METHOD FOR INTEGRATED CONTROLLER." The entirety of the aforementioned application is incorporated herein by reference.

TECHNICAL FIELD

In general, the present invention relates to a system that cuts or marks a workpiece. More particularly, the present invention relates to an integrated control architecture for motion control and process control.

BACKGROUND OF THE INVENTION

Systems can be used to cut or mark a workpiece that has a thickness and is composed of a type of material such as steel, metal, aluminum, among others. Generally, a cutting operation is cutting completely through the workpiece and a marking operation is marking a surface of the workpiece. Such systems can include, laser cutting systems, waterjet cutting systems, automated cutting systems, plasma cutting systems, among others.

Laser cutting systems use a laser to cut materials. A laser cutting system directing a high-power laser at the workpiece to be cut or marked. The workpiece can be either melted, burned, or vaporized away, and is blown away by a jet of gas, leaving a high-quality surface and clean edge. For instance, laser cutting systems can be used to cut or mark flat-sheet material as well as structural and piping materials.

Waterject cutting systems uses high-pressure jet of water, or a mixture of water and an abrasive substance to cut or mark a workpiece. Waterjet cutting systems can cut or mark materials such as metal or granite (using a mixture of water and an abrasive substance) and rubber or wood (using water without an abrasive substance).

Plasma cutting tools used to cut or otherwise operate on a workpiece typically comprise a gas nozzle with an electrode therein. Generally, plasma tools direct gas through a nozzle toward the workpiece, with some or all the gas ionized in a plasma arc between the electrode and the workpiece. The arc is used to cut, mark or otherwise operate on the workpiece.

In most tools, a pilot arc is first established between the electrode and the nozzle. Then, the pilot arc is transferred from the nozzle to the workpiece for cutting and/or other operations. For example, some tools use contact-based starting, with the electrode and nozzle initially in contact with one another. While current is passing through the electrode and nozzle, the electrode and nozzle are moved apart to create a gap. A spark across the gap initiates the pilot arc in a successful starting operation. While others use high voltage (either high frequency AC or a DC pulse) to break down the gap where the electrode and nozzle are fixed with respect to one another.

Cutting and/or marking systems are automated or semi-automated and what is needed is an improved technique to improve cycle times, quality (cut face surface finish and bevel), and accuracy of the cutting or marking operation.

SUMMARY OF THE INVENTION

In accordance with an embodiment of the present invention, a system for cutting or marking a workpiece that includes a workpiece, a gantry, a table that supports the workpiece, a power supply, and an implement that performs an operation, wherein the operation is at least one of a cutting of the workpiece or a marking of the workpiece. The system can further include an input component that is configured to receive a user input associated with a parameter to perform the operation. The system further includes a controller that is configured to provide the following: a height control for the implement that manages a motion toward the workpiece or away from the workpiece; a consumable control for the operation; a power control to the power supply for the operation; a motion control for the implement that manages a motion about the workpiece; and a process control for the operation.

In accordance with an embodiment of the present invention, a system for cutting or marking a workpiece is provided that includes at least the following: a workpiece; a gantry; a torch; a table that supports the workpiece; an input component that is configured to receive a user input associated with a parameter to perform the plasma cutting or marking operation, wherein the parameter is at least one of a desired shape profile for the workpiece, a thickness of the workpiece, a material type of the workpiece, or a cutting velocity; a housing that includes a controller; the controller generates a first set of machine readable instructions that control an x axis motion of the torch with a position component; the controller generates a second set of machine readable instructions that control a y axis motion of the torch with the position component; the controller generates a third set of machine readable instructions that control a z axis motion of the torch with the position component; the controller generates a fourth set of machine readable instructions that control a gas flow from a gas supply of the plasma cutting or marking operation, wherein the gas control includes management of a gas valve assembly or assemblies for management of a sequence of distribution of the shield gas and the plasma gas and venting of the plasma gas; and the controller communicates at least one of the first set of machine readable instructions, the second set of machine readable instructions, the third set of machine readable instructions, or the fourth set of machine readable instructions to perform the plasma cutting or marking operation with the torch based on the parameter.

In accordance with an embodiment of the present invention, a system that performs a plasma cutting or marking operation on a workpiece includes a workpiece, a gantry, a torch, a table that supports the workpiece, means for receiving a user input associated with a parameter to perform the plasma cutting or marking operation, wherein the parameter is at least one of a desired shape profile for the workpiece, a thickness of the workpiece, a material type of the workpiece, or a cutting velocity, and a housing that includes a controller. The controller can generate a first set of machine readable instructions that control an x axis motion of the torch with a position component, a second set of machine readable instructions that control a y axis motion of the torch with the position component, a third set of machine readable instructions that control a z axis motion of the torch with the position component, and a fourth set of machine readable instructions that control a gas flow from a gas supply of the plasma cutting or marking operation, wherein the gas control includes management of a gas valve assembly or assemblies for management of a sequence of distribution of the shield gas and the plasma gas and venting of the plasma gas. The system can further include means for communicating at least one of the first set of machine readable instructions, the second set of machine readable instructions, the third set of machine readable instructions, or the fourth set of machine readable instructions to perform the plasma cutting or marking operation with the torch based on the parameter.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
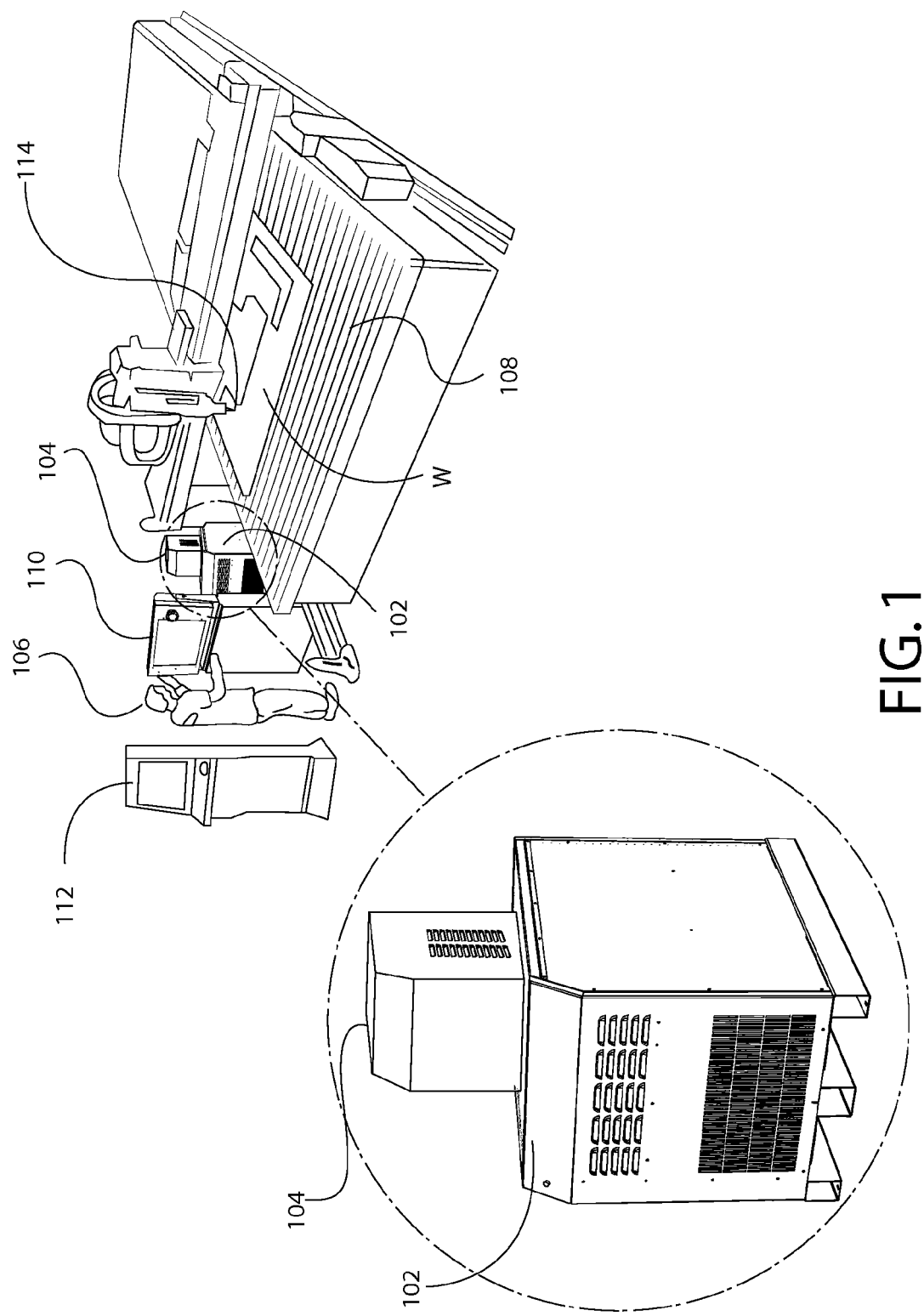
FIG. 1 illustrates a perspective view of a cutting system.

Embodiments of the invention relate to methods and systems that relate to integrating cutting or marking operation parameters and motion parameters. A controller is provided that manages both process related control, power control, and motion related controls rather than having separate controllers with respective connectivity. Conventional techniques use serial communications between process related controllers and motion related controllers which translate into communication delays, process delays, and/or increased cycle times in desired workpiece fabrication. Moreover, conventional techniques use a welder component with multiple controllers for each aspect (e.g., motion in each direction, power, ignition control, plasma control, gas control, etc.) of the cutting or marking process. Thus, conventional techniques often include complex data communications between the multiple controllers in order to perform a cutting or marking process, and in particular, a plasma cutting or marking process. An integrated controller is provided to integrate process related control, power control, and motion related control to directly control a cutting or marking operation with improved dynamics while minimizing connectivity and data communications. The integrated control described herein provides an increase in response time in regards to feedback control as well as increasing quality for cutting or marking operations.

"Cut," "cutting," "mark," or "marking" as used herein including any other formatives of these words will refer to cutting completely through a workpiece or surface marking a workpiece which can include, but is not limited to including, plasma cutting, plasma marking, laser cutting, laser marking, waterjet cutting, waterjet marking, routing, milling, grinding, or any implement that can cut or mark a workpiece. Further, the control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

A portion of "scrap" as used herein is a remaining unwanted portion of a workpiece after a cutting or marking operation is performed. In particular, a cutting operation performs a separation of a portion of the workpiece that creates a scrap edge and a scrap edge in comparison to the desired workpiece that includes a scrap edge and a non-scrap edge.

A "desired workpiece" as used herein is a remaining portion of a workpiece after a cutting or marking operation is performed. In particular, a cutting operation performs a separation of a portion of the workpiece that creates a scrap edge and a non-scrap edge, wherein the non-scrap edge is an edge of the desired workpiece. In an embodiment, a desired workpiece can be cut having a start time and an end time during the cutting operation, wherein the cutting operation between the start time and the end time includes a cutting velocity and one or more geometric coordinates (e.g., x axis, y axis, and/or z axis). During the cutting operation to create the desired workpiece, a non-scrap edge on the workpiece is created by the cutting operation. It follows that a scrap edge is also created during the cutting operation but is on a portion of scrap. At the start of the cutting operation, a lead in is used. At the end of the cutting operation, a lead out is used.

A "feedback" as used herein is data (e.g., a signal, a portion of data, a packet of data, an analog signal, a digital signal, and the like) that is representative of a state or parameter related to the cutting operation or a component that is used to perform the cutting operation or with performing the cutting operation (e.g., a position component, a gas control, a power source, an arc start component, a camera, an image device, a movement sensor, an audio sensor, a light sensor, a voltage sensor, a current sensor, a temperature sensor, a gas flow sensor, a pressure sensor, and the like).

A "lead in" as used herein is an additional distance (and an amount of time) to allow the implement to accelerate up to a cutting velocity before performing the cutting operation on the workpiece to achieve the desired workpiece. The lead in further allows for initiation of the arc and piercing of the plate away from the usable part edge so as not to distort. In an embodiment, the lead in is performed on a portion of scrap before a location of where the desired workpiece is to start.

A "lead out" as used herein is an additional distance (and an amount of time) to allow the implement to decelerate from the cutting velocity after performing the cutting operation on the workpiece to achieve the desired workpiece. The lead out further allows for termination of the arc away from the usable part edge so as not to distort. In an embodiment, the lead out is performed on a portion of scrap after a location of where the desired workpiece is to end.

As used herein, "x axis" is defined as an axis that coincides with a longitudinal axis of a cutting table that supports a workpiece. As used herein, "y axis" is defined as an axis that coincides with a latitudinal axis of a cutting table that supports a workpiece. As used herein, "z axis" is defined as an axis that coincides with a distance (e.g., a height) of a torch from the workpiece and/or cutting table.

Figure 2:
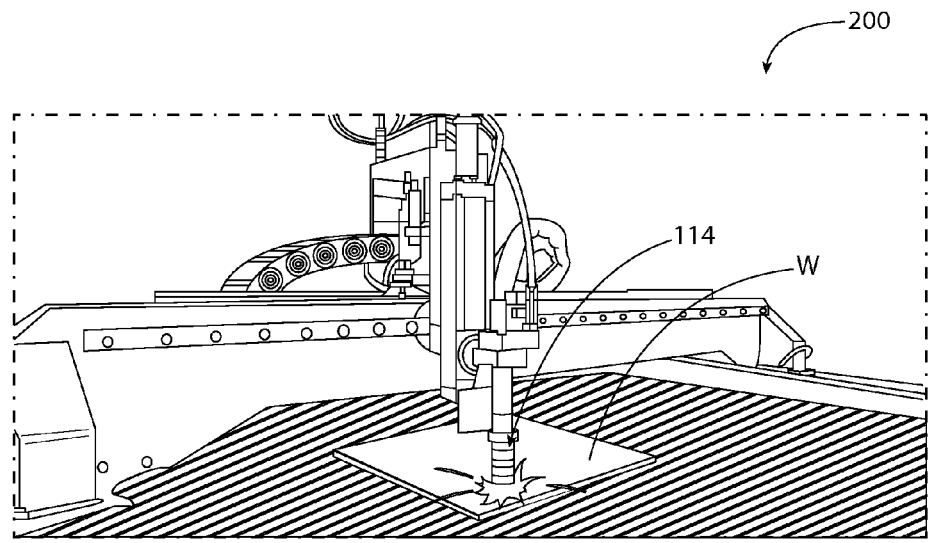
FIG. 2 illustrates a perspective view of a plasma cutting or marking operation being performed by a computer numeric control cutting system.
Figure 3:
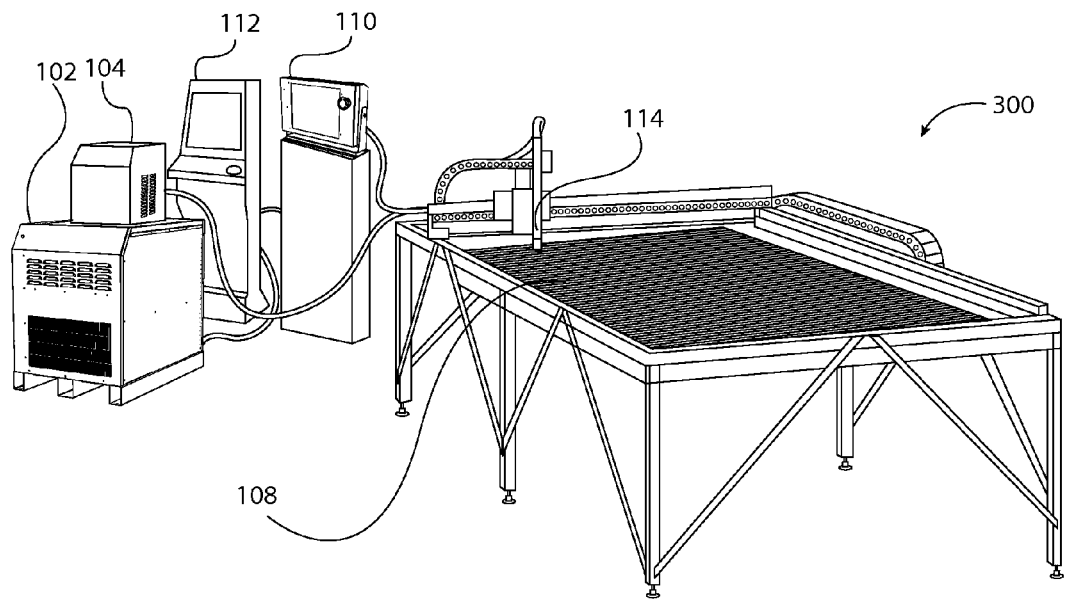
FIG. 3 illustrates a perspective view of cutting or marking table that can be used with a computer numeric control cutting system illustrated in FIG. 1.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-3 illustrate cutting systems that is used with an automated or semi-automated systems to cut or mark a workpiece. It is to be appreciated that the subject innovation can be used with any cutting system that cuts through a workpiece or marks a surface of the workpiece. Moreover, the subject innovation can be used with any system that allows motion for an implement utilizing geometric coordinates to control a movement in 2D (e.g., x and y axis) or 3D (x, y, and z axis) space, wherein the implement performs the cutting operation or marking operation. The term "cutting operation" as used herein can be defined as cutting through a workpiece or marking a surface of the workpiece.

FIG. 1 illustrates one example of a cutting system 100 that performs a plasma cutting or marking operation. It is to be appreciated that the subject innovation can be utilized with any suitable cutting or marking system that performs a cutting, a marking, a routing, and the like and plasma cutting is solely used for example. Other plasma arc torch systems of different configurations may be used with the present invention as well. For example, one of ordinary skill in the art can add or remove particular components in the system 100 while still performing a cutting or marking operation with a plasma operation and such variations of the system 100 are intended to be included within the scope of the subject innovation.

The system 100 can include a welder component 102 and respective controller for the plasma process, an automatic gas control component 104 and respective controller, an impulse start component and respective controller, an input component 110, a manual gas control component and a respective controller, a position component that provides motion in a first direction and a respective controller, a position component that provides motion in a second direction and a respective controller, a position component that provides motion in a third direction and a respective controller, a gas manifold assembly and respective controller, among others.

As shown, system 100 includes a welder component 102 used with a connected torch 114. The welder component 102 can include a housing that includes various components for controlling a plasma arc, such as a power supply, a plasma starting circuit, air regulators, input and output electrical and gas connectors, controllers, etc. . . . Torch 114 includes within it electrical or mechanical connectors to utilize an electrode and a nozzle. Separate electrical pathways may be provided for a pilot arc and a working arc, with switching elements provided within the welder component 102 and/or a separate component (not shown). A gas conduit is also present within torch 114 to transfer the gas that becomes the plasma arc to the torch tip. The system 100 can include one or more input components (also referred to as Human Machine Interfaces (HMIs) 110 and 112 that can be configured to at least receive a user input and/or communicate data between user 106 and system 100. The system 100 illustrates input component 110 and input component 112, wherein input component 110 can be utilized to communicate data between user 106 and one or more components of the system 100 and input component 112 can be utilized to communicate data between user 106 and one or more components of the system 100. FIG. 1 illustrates input component 110 and input component 112 but it is to be appreciated that any suitable number of input components can be used with system 100. The location of each input component 110 and input component 112 is illustrated solely for example and the physical location is not to be limiting on the subject innovation. In an embodiment, input component 110 and/or the input component 112 may be provided on the welder component 102 (as the input component 110 is illustrated), on a separate pedestal proximate to the welder component 102 (as the input component 112 is illustrated), on another component of the system 100, or any other location that allows a user 106 to interact therewith. The input component 110 and/or the input component 112 can further include various electrical and gas connectors in order to communicate data with the system 100 or a component of the system 100. For instance, input component 110 and/or the input component 112 can be, but is not limited to, a touchscreen, one or more buttons, one or more switches, one or more touch screens, a microphone or device to receive one or more voice commands, microphone for audio input, one or more cameras for gesture control input or movement input, a joystick, a smartphone, a tablet, a computer, a monitor, a keyboard, among others.

It should be understood that the system 100 illustrated in FIG. 1 and FIG. 3 are examples that could employ aspects of the inventive the concepts disclosed herein. Accordingly, the general disclosure and description above should not be considered limiting in any way as to the types or sizes of plasma arc systems that could employ the disclosed elements.

In an embodiment, the cutting system 100 can be utilized with a support 108 (also referred to as a cutting table or marking table illustrated in FIG. 3) that facilitates automation of the cutting operation. For instance, the support 108 can be a structure on which the workpiece is placed. In a particular embodiment, support 108 can be a cutting table and a gantry can be used with at least torch 114. Support 108 can include components that provide motion to at least one of the torch 114 about the workpiece W or the workpiece W about the torch 114. In an embodiment, a position component (shown and discuss below) can be utilized to provide motion to at least one of the workpiece W or torch to perform the cutting operation to achieve the desired workpiece. It is to be appreciated that one or more position components can be used to provide movement to perform a cutting or marking operation. For instance, a position component can be used to provide at least one of an x axis motion, a y axis motion, or a z axis motion. By way of example and not limitation, a first position component can be used to provide movement in an x and y axis and a second position component can be used to provide movement in a z axis. The support 108 and system 100 is illustrated for example and any suitable support 108 or system 100 can be chosen with sound engineering judgment by one skilled in the art without departing from the intended scope of embodiments of the subject innovation.

It is to be appreciated that the input component 110 and/or input component 112 as illustrated can be used with at least one of the components that comprise of the plasma or marking system 100. In particular, the input component 110 and/or the input component 112 can be an HMI to interact with data with at least one of the welder component 102, the automatic gas control component 104, an impulse start component 112, a manual gas control component (not shown), among others. In still another embodiment, each component of the system 100 (e.g., the welder component 102, the automatic gas control component 104, an impulse start component, a manual gas control component, and the like), can have a respective HMI. It is to be appreciated that these various embodiments are intended to be included within the scope of the subject innovation.

FIG. 2 illustrates a portion of system 100 (from FIG. 1) while performing a cutting or marking operation. FIG. 3 illustrates a cutting system with a cutting or marking table 300 that can support a workpiece for a cutting operation or a marking operation. The cutting table 300 can be used with the cutting system 100. The cutting systems within the scope of this subject innovation (e.g., illustrated in at least FIGS. 1-3) can be a computer numeric control (CNC) cutting system that provides automated control to perform a cutting operation via machine readable instructions. It is to be appreciated that cutting system 100 in FIG. 1, the illustration in FIG. 2 performing the marking or cutting operation, or the cutting system illustrated in FIG. 3, or are not to be limiting on the subject innovation but are provided and discussed solely for example.

Cutting systems, described herein, can perform automated cutting operations with machine readable instructions that include one or more geometric coordinates (e.g., x axis, y axis, and z axis) and a cutting velocity to use while creating a non-scrap edge on the desired workpiece. Such instructions can be utilized by one or more position components that provide motion to workpiece and/or torch. For instance, position component (discussed in more detail below in FIG. 10) can be a drive that provides motion in at least one of an x axis, a y axis, or a z axis.

Figure 4:
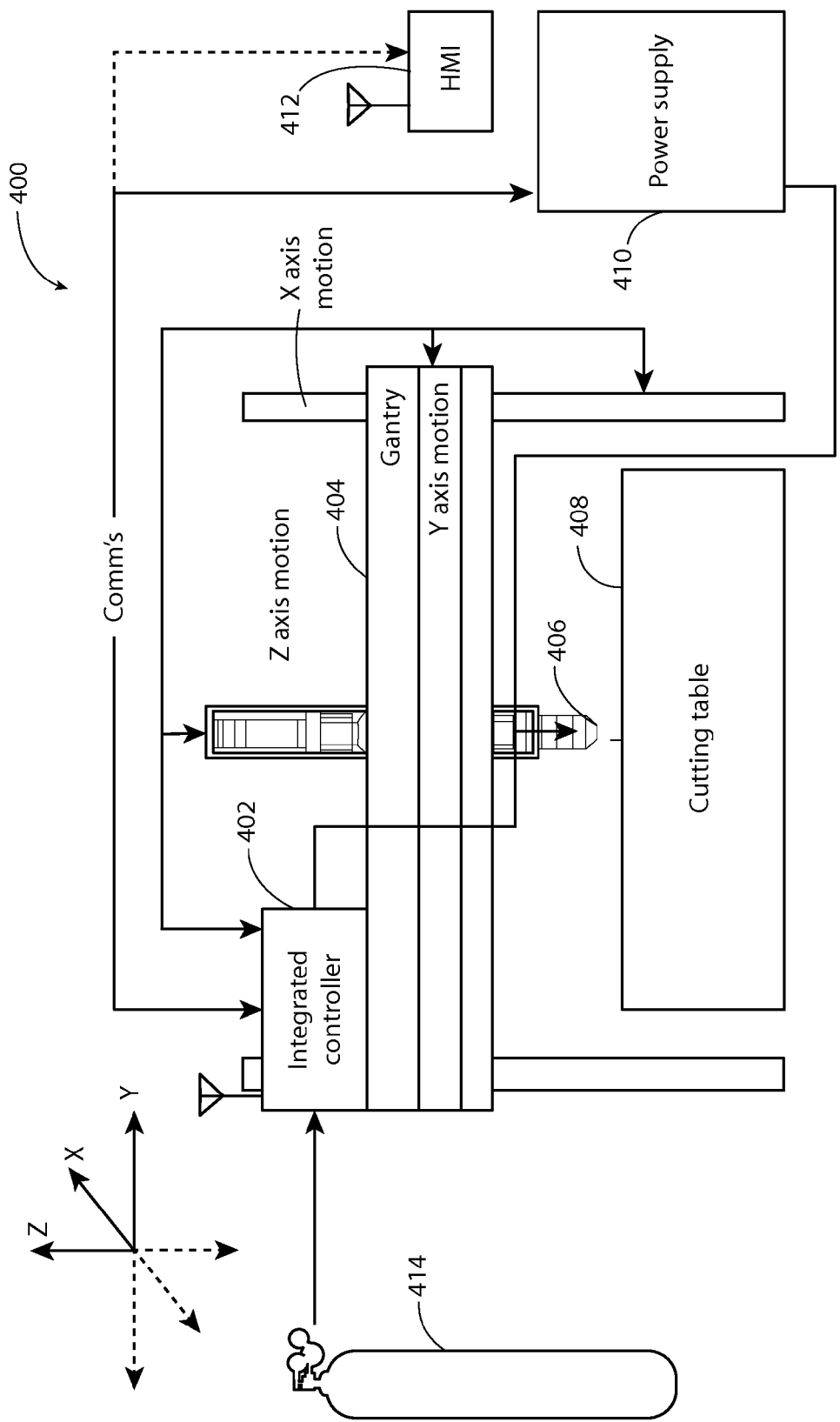
FIG. 4 illustrates a cutting system with integrated controller as embodied by the invention.

FIG. 4 illustrates a cutting or marking system 400. System 400 includes controller 402 (e.g., integrated controller) that provides unified control of performance of a cutting or marking operation for a cutting or marking system illustrated in FIGS. 1-3. Controller 402 can be used to control electronic communication with the cutting or marking system 502. For instance, controller 402 can be utilized with the welder component 102 described in FIGS. 1-3 rather than the multiple controllers for each aspect of the cutting or marking system. System 400 can include gantry 404 to which controller 402 can be affixed. Implement 406 can move in 3 dimensional (3D) space such as about the z axis, the y axis, and the x axis via a position component (discussed in more detail below in FIG. 10). Workpiece is supported by cutting table 408. As depicted, controller 402 can control motion of implement 406 (e.g., z axis motion, x axis motion, and/or y axis motion), gas selection and control from gas source 414, power supply 410, and/or communications (e.g., communications between controller 402 and power supply 410, communications between controller 402 and HMI 412, among others). Controller 402 can further communicate wirelessly, wired, or a combination thereof with at least one of a network, a subnetwork, power supply 410, HMI 412, a drive (e.g., position component) that controls motion (e.g., z axis, x axis, y axis), gas selection and control, a valve, a transducer, a switch, an external drive interface, implement 406, among others.

By way of example and not limitation, implement 406 can be a torch, a routing blade, a tool, a cutting tool, a blade, a welder, an implement used with a plasma cutting or marking operation, an implement used with a laser cutting or marking operation, an implement used with a waterjet cutting or marking operation, and the like. Power source 410 can supply a portion of power to perform the cutting operation with a cutting or marking technique (e.g., plasma, waterjet, laser, routing, among others). For instance, in a plasma cutting technique, power source 410 can supply power for at least one of motion of implement 406, control of the plasma cutting operation, control of supply of a gas, a voltage output to implement 406, a current output to implement 406, a heat source output to implement 406, and the like Controller 402 integrates power control, gas selection and control (for plasma cutting operation), height control, and motion control. Controller 402 can be configured to set operating parameters for a cutting or marking operation based on material type, material thickness, and/or shape/contour (e.g., a desired shape profile for the workpiece or a contour for the workpiece) of the desired workpiece. Controller 402 can manage parameters related to the cutting or marking operation such as, but not limited to, current, implement 406 height (e.g., torch height), voltage, plasma gas and pressure (for plasma cutting operation), shield gas and pressure (for plasma cutting operation), water pressure (for waterjet operation), mixture of water and abrasive substance (for waterjet operation), among others. It is to be appreciated that each cutting or marking operation such as, but not limited to, plasma, waterjet, laser, milling, grinding, and the like can include respective parameters that can be adjusted by controller 402.

Controller 402, having integrated control for process related parameters and motion related parameters, can utilize algorithms based on motion to further improve cut or mark performance and quality such as adjusting current and/or gas profiles during the operation. In particular, based on the desired workpiece being cut or marked, the process related parameters and motion related parameters can be dynamically adjusted.

Controller 402 can be affixed to gantry 404. By affixing controller 402 in close proximity to implement 406 (also referred to as torch), gas volume between controller 402 and implement 406 are reduced which improves responsiveness and/or cycle times to create the desired workpiece. Controller 402 can utilize one or more deterministic communication protocols such as, but not limited to, an Ethernet, a serial real time communication system (Sercos), a controller area network (CAN), a network, a LAN, a WLAN, a wireless network, and the like. For instance, controller 402 can utilize a deterministic communication protocol to control power signals to one or more power supplies such as power supply 410.

HMI 412 can be utilized to receive a user input. It is to be appreciated that HMI 412 can be a human machine interface (HMI) and is also referred to as input component. HMI 412 can be configured to receive a user input associated with a parameter to perform the cutting or marking operation. HMI 412 can be in wired or wireless communication with controller 402. The HMI 412 can be a stand-alone component (as depicted), incorporated into power supply 410, incorporated into controller 402, or a combination thereof.

For instance, HMI 412 (e.g., input component) can receive at least one of a thickness of the workpiece, a material type of the workpiece or a cutting velocity, a shape of the desired workpiece, a geometric coordinate of the desired workpiece, a contour of the desired workpiece, among others. In an embodiment, HMI 412 (e.g., input component) can receive a user input and/or an electronic signal representative of the user input. Further, HMI 412 (e.g., input component) can communicate the user input and/or electronic signal representative of the user input.

HMI 412 (e.g., input component) can communicate data representative of a user input to cutting system 400 with a wired signal, wireless signal, or a combination thereof. For example, HMI 412 (e.g., input component) can be, but is not limited to being, a pendant, a controller, and the like. In such example, the pendant or the controller can be a wireless connection or a wired connection to communicate with cutting system 400. It is to be appreciated that HMI 412 (e.g., input component) can transmit and/or receive data to and from cutting system 400 via wired connection, a wireless connection, and/or a combination thereof.

In an embodiment, at least one of a program, a nest, a set of machine readable instructions, a cutting profile, a lead in profile, a lead out profile, a geometric coordinate, a shape contour, a desired workpiece contour, and the like, can be directly downloaded to controller 402. For instance, a communication port can be incorporated into controller 402 that allows for data communications. In a particular embodiment, the communication port can be a USB port that allows data to be directly received at controller 402. In another embodiment, the communication port can be a wireless interface device that allows controller 402 to communicate with a network, a wireless network, among others. In still another embodiment, the communication port can be a wired connection that allows communication with controller 402. For instance, controller 402 can download machine readable instructions related to a desired workpiece contour. Controller 402 can further, for example, upload data via the communication port to a source, wherein the source can be, but is not limited to, a network, a hard drive, a storage device, a memory, and the like.

For example, to achieve a desired workpiece, the cutting operation is to be performed with a particular pattern, shape, or dimension, wherein the desired workpiece is defined with one or more geometric coordinates. Moreover, to achieve the desired workpiece upon completion of the cutting operation, a cutting velocity is defined at which to maintain during the cutting operation (e.g., from a start point to an end point). For a cutting operation to achieve the desired workpiece, a lead in and a lead out is used with the cutting operation. The cutting operation can include a cutting profile that is defined as one or more geometric coordinates related to the desired workpiece and a cutting velocity to perform the cutting operation. For example, the cutting profile can include geometric coordinates from a start of the cutting operation through to the end of the cutting operation, wherein geometric coordinates define a start location of a first movement of cutting system 400, an end location of the last movement of cutting system 400, a start point where a non-scrap edge is created during the cutting operation, an end point were the last non-scrap edge is created, among others. The cutting profile defines movement from the start location of the cutting operation to the end location of the cutting operation. The cutting profile utilizes the cutting velocity between the start point and the end point to create the desired workpiece. By way of example and not limitation, the cutting profile can be machine readable instructions, a portion of a program, a portion of computer code, a set of instructions, a portion of data that can be compiled into a program, and the like. Moreover, controller 402 can create and utilize the cutting profile.

Controller 402 can receive, create, and utilize one or more geometric coordinates to provide motion to allow creation of the desired workpiece. The one or more geometric coordinates for the desired workpiece can relate to at least one of an x axis, a y axis, and/or a z axis. Controller 402 can be future configured to receive the one or more coordinates via a user, a computer, a data base, a network, a server, among others. In an embodiment, controller 402 can be configured to create a portion of the cutting profile. In an example, a user can create a cutting profile. In another example, a cutting profile can be stored upon completion and accessed for use with a cutting operation performed at a later time. In still another example, a user can utilize controller 402 to access a cutting profile and edit such cutting profile to tailor for a desired workpiece. It is to be appreciated that the cutting profiles, geometric coordinates, and the like can be created, received, and/or accessed via at least one of controller 402, a network, a server, the Internet, a data base, a hard drive, a memory, an external harddrive, a computer, and the like Controller 402 can further control internal and/or external drives. Controller 402 can include an internal drive. Controller 402 can further include an external drive interface. Controller 402 can control an external drive via a deterministic communication protocols such as, but not limited to, an Ethernet, a serial real time communication system (Sercos), a controller area network (CAN), a network, a LAN, a WLAN, a wireless network, and the like.

Based on at least the above, controller 402 provides improved cycle times, improved operation quality (e.g., improved cut quality of desired workpieces with complex shapes or contours), and/or minimal system complexity with connectivity or connections (e.g., consolidation of multiple controllers and interconnections to controller 402).

Figure 5:
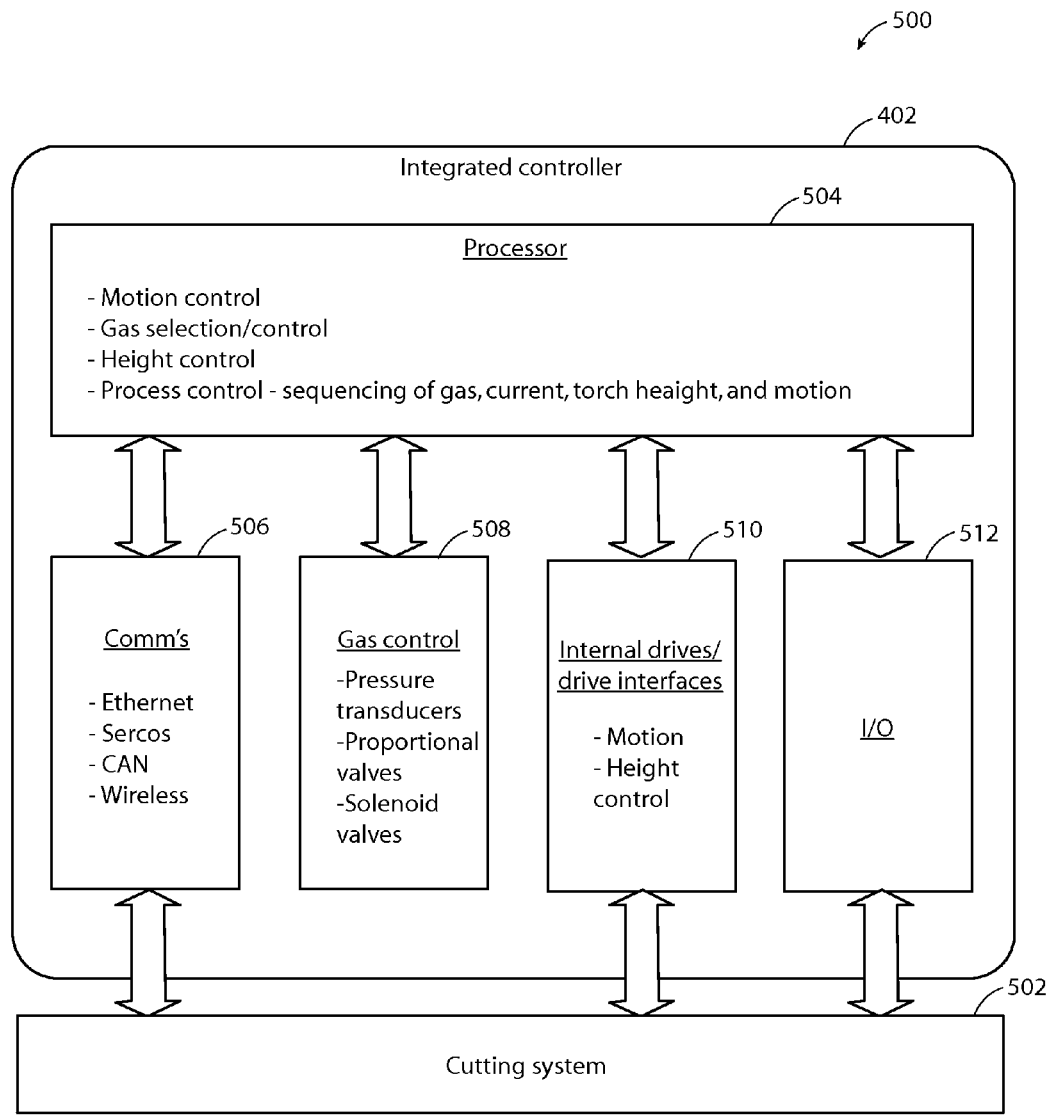
FIG. 5 illustrates an integrated controller for a cutting or marking system.

FIG. 5 illustrates an embodiment of controller 402 in accordance with the subject innovation. Controller 402 can be an integrated controller that integrates process related control with motion related control for a cutting system 502 or a marking system. It is to be appreciated that controller 402 is solely for example and is not to be limiting on the subject innovation.

Controller 402 can include processor 504 that manages motion control, gas selection, gas control, height control, and process control (e.g., sequencing of gas, current, voltage, travel speed, and the like). Controller 402 further includes communications 506 (e.g., comms), gas control 508, internal drives and/or drive interface 510, and input/output 512. For example, input/output 512 can be feedback signals and/or control signals (e.g., machine readable instructions discussed below).

In an embodiment, controller 402 can manage one or more power supplies. For instance, each power supply can be configured for a particular power output and controller 402 can utilize one or more of the power supplies based on a desired power need. In another embodiment, a particular current output can be desired by controller 402 in which one or more power supplies are utilized to reach the particular current output. For instance, a first power supply can provide 100 amp and a second power supply can provide 300 amp, wherein controller 402 can utilize the first power supply for 100 amp demands and utilize the second power supply for 300 amp demands. Still further, controller 402 can combine and use first power supply and second power supply to achieve a 400 amp demand.

In an embodiment, the operation is at least one a laser operation, a waterjet operation, or a milling operation. In an embodiment, the process is a plasma operation. In an embodiment, the consumable control for the operation is gas selection and the process control includes a sequencing of at least one of a gas, a current, or a voltage. In an embodiment, the process control includes a sequence of the height control and the motion control.

In an embodiment, the following is provided the height control is a set of machine readable instructions for a drive that controls a motion in a z axis; the consumable control is a set of machine readable instructions for at least one of a pressure transducer, a proportional valve, or a solenoid valve related to a gas selection for the operation; the motion control is a set of machine readable instructions for a drive that controls at least one of a motion in an x axis about the workpiece, a motion in a y axis about the workpiece, a travel speed, a lead in, or a lead out and a process control for the operation is a set of machine readable instructions for sequencing at least one of a gas used with the operation, a current for the operation, or a voltage of the operation.

In an embodiment, the parameter is a desired shape profile for the workpiece or a contour for the workpiece. In an embodiment, the parameter is at least one of a thickness of the workpiece, or a material type of the workpiece or a cutting velocity. In an embodiment, the input component is further configured to communicate the user input wirelessly to the controller. In an embodiment, the input component is incorporated into the power supply. In an embodiment, the controller is affixed to the gantry.

In an embodiment, controller further includes at least one of the following: a first communication component that receives data for the controller from at least one of a drive that controls a motion in a z axis, a pressure transducer, a proportional valve, a solenoid valve, a drive that controls a motion in an x axis, a drive that controls motions in a y axis, or the power supply of the operation; or a second communication component that transmits data from the controller to at least one of a drive that controls a motion in a z axis, a pressure transducer, a proportional valve, a solenoid valve, a drive that controls a motion in an x axis, a drive that controls motions in a y axis, or the power supply of the operation.

In an embodiment, at least one of the first communication component or the second communication component is at least one of an Ethernet, a serial real time communication system (Sercos), a controller area network (CAN), a network, a LAN, a WLAN, or a wireless network.

In an embodiment, the controller is further configured to generate an updated machine readable instruction for at least one of the height control, the consumable control, the motion control, or the process control, wherein the updated machine readable instruction is based on a dynamic monitoring of the operation. For instance, a setting, parameter, or variable associated with a cutting or marking operation can be monitored which can allow an adjustment of the cutting or marking operation. In general, feedback (e.g., a feedback signal, a portion of data, etc.) can be received from the cutting or marking operation in which the controller can dynamically adjust to compensate. For instance, the feedback can be related to a state or a cutting parameter such as, but not limited to, a voltage, an x axis coordinate, a y axis coordinate, a z axis coordinate, a current, a height, a measurement of a workpiece, a travel speed, a thickness of the workpiece, a temperature, among others. Feedback and monitoring as disclosed in Assignee's U.S. application Ser. No. 14/079,799 filed on Nov. 14, 2013 can be utilized with a cutting or marking system and is incorporated herein by reference.

In an embodiment, the controller receives a feedback of the plasma cutting or marking operation and dynamically adjusts a setting of the plasma cutting or marking operation, wherein the setting is at least one of a current, a voltage, a height of the torch, the gas flow from the gas supply, or a sequence of one or more gases from the gas supply.

In an embodiment, the controller generates a fifth set of machine readable instructions that control transmission of a single unipolar high voltage impulse to initiate a pilot arc used with the plasma cutting or marking operation. In an embodiment, the system can include at least one power supply that supplies a portion of power for the plasma cutting or marking operation, wherein the controller communicates with the at least one power supply with a deterministic communication protocol. In an embodiment, the input component is further configured to communicate the user input wirelessly to the controller.

Figure 6:
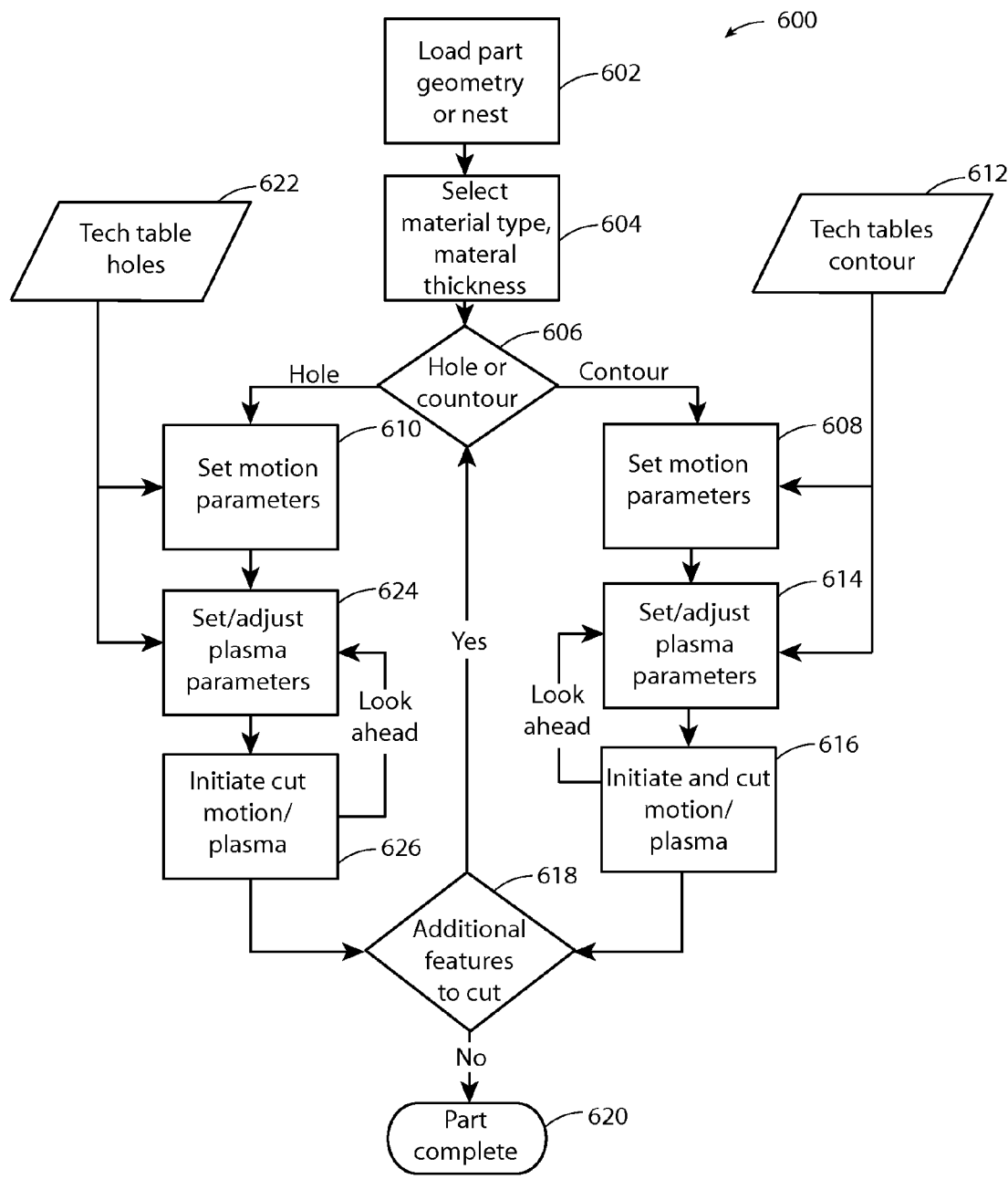
FIG. 6 is a flow diagram of utilizing an integrated controller to perform the cutting or marking operation.

In view of the exemplary devices and elements described supra, methodologies that may be implemented in accordance with the disclosed subject matter will be better appreciated with reference to the flow charts and/or methodologies, here FIG. 6. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

FIG. 6 illustrates method 600 that utilizes an integrated controller to perform the cutting operation. Sequentially, the following occurs as illustrated in the decision tree flow diagram 600 of FIG. 6 which is a flow diagram 600 that employs an integrated controller. In an embodiment, the integrated controller can be used with a cutting operation or a marking operation.

A portion of data related to a geometric coordinate for a desired workpiece can be loaded (reference block 602). For instance, a part geometry or nest can be loaded. Material type and/or material thickness can be selected (reference block 604). For instance, a user can select via an HMI, the material thickness and/or material type. A determination is made whether a hole or a contour is created with the operation (reference block 606). If a contour is to be created with the operation, the methodology continues to reference block 608. If a hole is to be created with the operation, the methodology continues to reference block 610.

The following is for a desired workpiece that is a contour. A motion parameter can be set (reference block 608). For instance, a tech tables contour (reference block 612) can be used to supply or deliver the one or more motion coordinates. Cut parameters can be set (reference block 614). For example, parameters related to a plasma operation can be set. Initiate cut motion and cutting operation parameters (reference block 616). Based on dynamic monitoring, a look ahead can be configured to allow dynamic adjustment on the operation. For instance, based on dynamic monitoring, a parameter (e.g., cut parameter) can be adjusted (reference block 614), wherein the parameter can be related to motion and/or cut operation (e.g., motion related control and process related control). A determination is made whether additional features of the desired workpiece are to be performed (reference block 618). If there are not additional features, the part or desired workpiece is complete (reference block 620). If there are additional features, the methodology continues to determine whether the operation is a hole or contour (reference block 606).

The following is for a desired workpiece that is a hole. A motion parameter can be set (reference block 610). For instance, a tech tables contour (reference block 622) can be used to supply or deliver the one or more motion coordinates. Cut parameters can be set (reference block 624). For example, parameters related to a plasma operation can be set. Initiate cut motion and cutting operation parameters (reference block 626). Based on dynamic monitoring, a look ahead can be configured to allow dynamic adjustment on the operation. For instance, based on dynamic monitoring, a parameter (e.g., cut parameter) can be adjusted (reference block 624), wherein the parameter can be related to motion and/or cut operation (e.g., motion related control and process related control). A determination is made whether additional features of the desired workpiece are to be performed (reference block 618). If there are not additional features, the part or desired workpiece is complete (reference block 620). If there are additional features, the methodology continues to determine whether the operation is a hole or contour (reference block 606).

Figure 7:
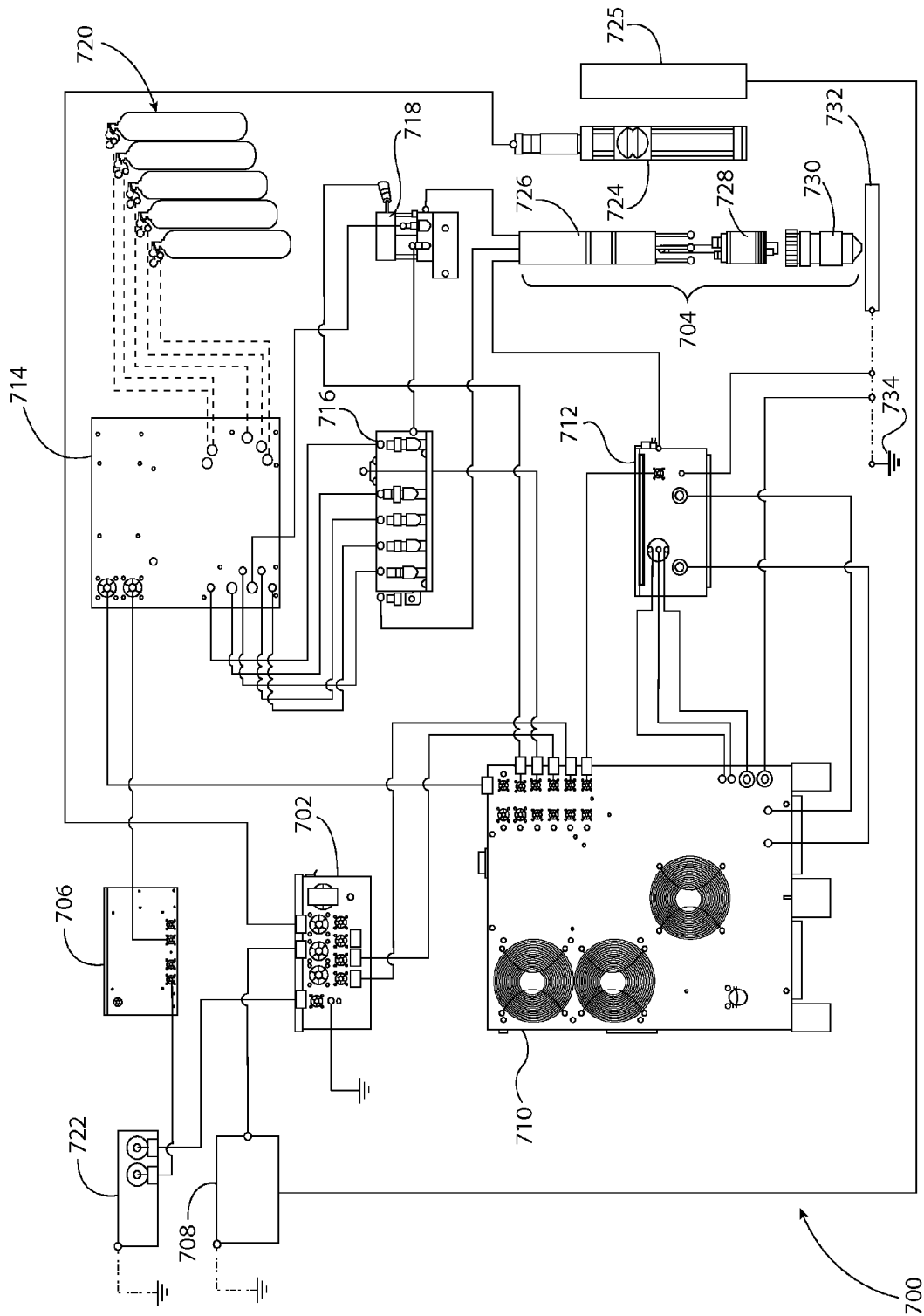
FIG. 7 is a diagram illustrating communications with a conventional shape cutting system.

FIG. 7 illustrates system 700 that is representative of conventional communications and connections with a shape cutting system. System 700 includes multiple controllers with various connectivity between one another which causes delay and inaccuracies for the cutting or marking operation. System 700 includes height controller console 702 (e.g., Inova console) that controls height of torch 704 during a plasma operation, plasma console 706 to control the plasma operation, CNC controller 708 for x axis and y axis motion, plasma power supply 710, impulse start console 712, automatic gas console 714 (that may use a manifold assembly such as, but not limited to, 5-gang manifold 716 and/or 2-gang manifold 718), gas supply 720 (e.g., at least one of Oxygen, H17, Air, Nitrogen, Argon, among others) managed by the automatic gas console 714, remote component 722 (e.g., Inova Remote) that controls height controller console 702, and position component 724 (e.g., also referred to as "positioner") that controls movement in at least one of an x axis, a y axis, or a z axis. It is to be appreciated that an embodiment can include position component 724 that controls movement in the z axis (e.g., height movement toward or away from a workpiece) and a drive component 725 that controls movement in the x axis or the y axis (e.g., horizontal and vertical movement). Torch 704 can include torch handle 726, torch base 728, and torch head 730 to perform a cutting or marking operation on workpiece 732 which can include star ground 734.

Figure 8:
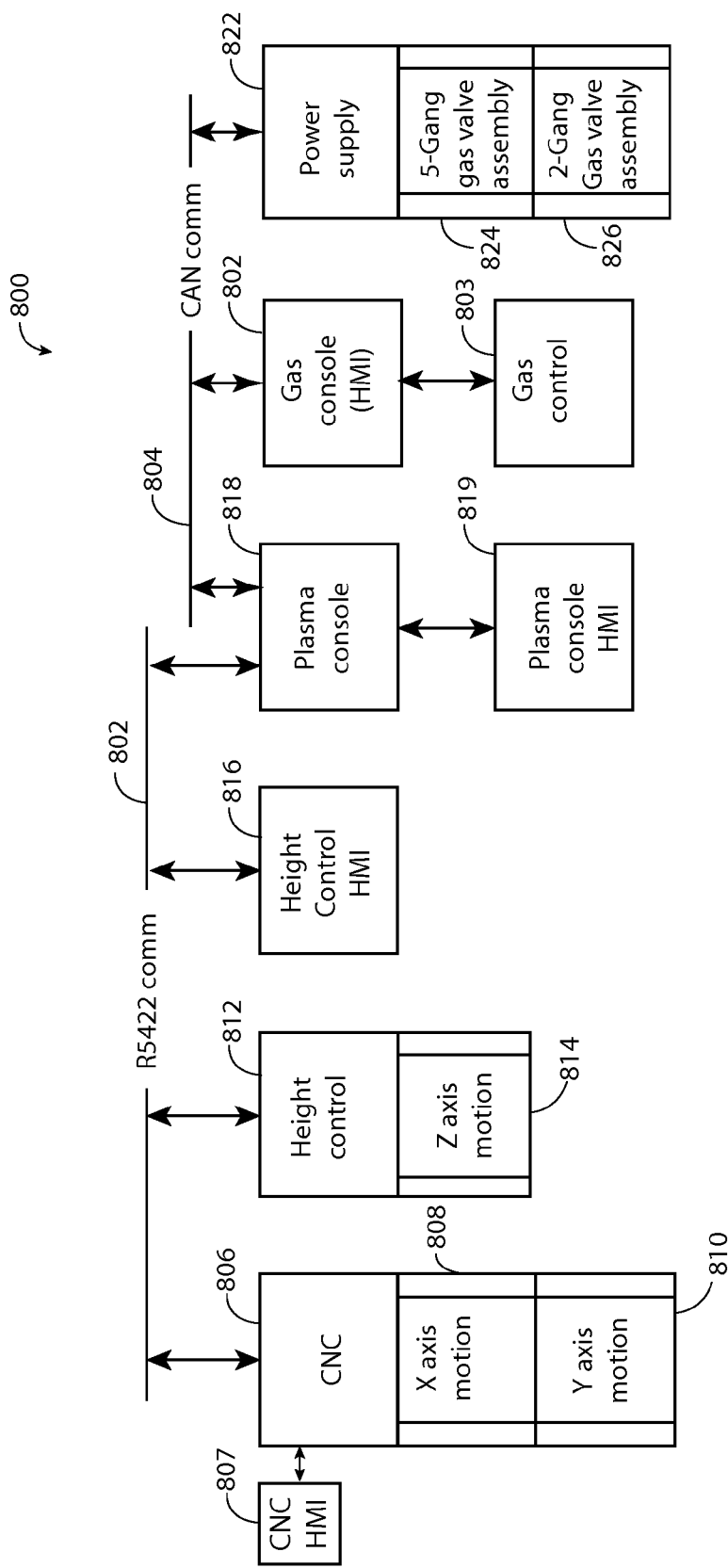
FIG. 8 illustrates a conventional cutting system architecture.

FIG. 8 illustrates block diagram 800 of a plasma cutting system. In particular, the diagram 800 can be representative of the system 700 illustrated in FIG. 7. Diagram 800 illustrates a control architecture that utilizes multiple controllers on more than one communication link. Diagram 800 includes RS422 802 and CAN comm 804. RS422 802 is used by CNC controller 806, CNC HMI 807, height controller 812 (e.g., Inova height controller), height control HMI 816 (e.g., Inova remote HMI), plasma controller 818 (plasma console), and plasma console HMI 819. CAN comm 804 is used by plasma controller 818 (plasma console), plasma console HMI 819, gas controller 803, gas console 820 (gas console HMI), power supply 822, a manifold assembly such as, but not limited to, 5-gang gas valve assembly 824, and 2-gang gas valve assembly 826. CNC controller 806 can include CNC HMI 807 that is configured to communicate data and/or input/output for the CNC controller 806. Gas controller 803 can include gas console HMI 802 that is configured to communicate data and/or input/output for the gas controller 803. Plasma console 818 can include plasma console HMI 819 that is configured to communicate data and/or input/output for the plasma console 818. Height control 812 can include height control HMI 816 that is configured to communicate data and/or input/output for the height control 812. It is to be appreciated that any suitable gas vavle assembly or manifold assembly can be used with the subject innovation and a 5-gang gas valve assembly or a 2-gang gas valve assembly is not to be limiting on the subject innovation. CNC controller 806 can control x axis motion 808 and y axis motion 810, for example. Height controller 812 (e.g., Inova height controller) can control z axis motion 814, for example.

Figure 9:
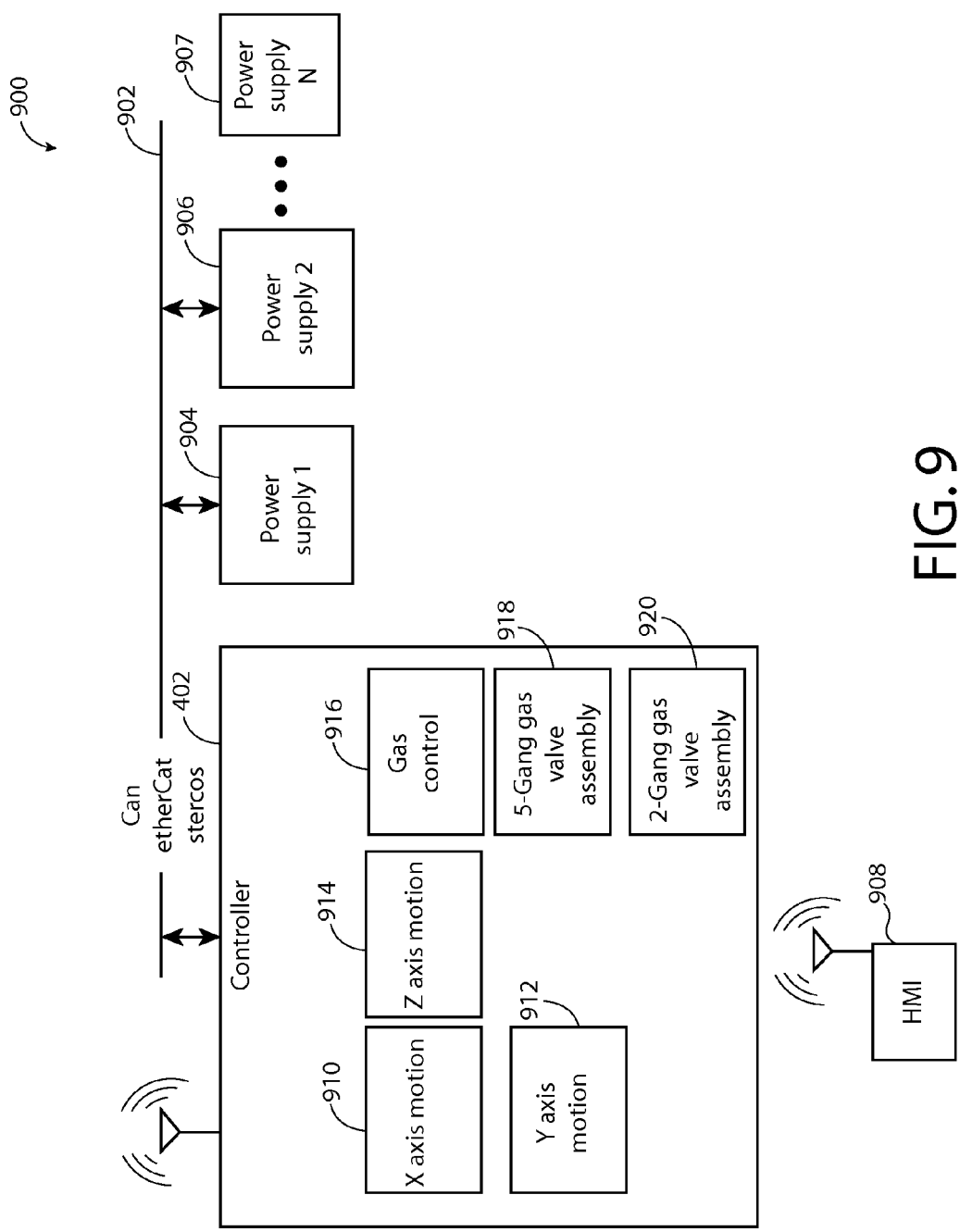
FIG. 9 illustrates a cutting system in accordance with the subject innovation.

FIG. 9 illustrates a cutting system 900 in accordance with the subject innovation. System 900 can include controller 402 that communicates and/or receives data to control a plasma cutting or marking operation. Controller 402 can communicate with one or more power supplies via deterministic communication protocol 902. For instance, deterministic communication protocol 902 can be Ethernet, CAN, Sercos, among others. Additionally, controller 402 can manage one or more power supplies used to perform a cutting or marking operation. For instance, controller 402 can control a power supply 904 and a power supply 906. It is to be appreciated that there can be any suitable number of power supplies such as power supply 904, power supply 906, and power supply N 907, where N is a positive integer. HMI 908 can communicate with controller 402 that can provide a user input related to the cutting or marking operation. In an embodiment, HMI 908 can communicate wirelessly with controller 402 or with a wired connection. In particular, it is to be appreciated that HMI 908 can be used to communicate data and/or input/output for one or more of the following: a position component that controls x axis motion; a position component that controls y axis motion, a position component that controls z axis motion; a plasma console; controller 402 that is configured to provide control for two or more of CNC, height control, plasma control, gas control, or power supply; a gas valve assembly; a power supply; an arc start component; and the like.

Controller 402 can include process control and motion control rather than utilizing multiple controllers. Controller 402 can include x axis motion 910, y axis motion 912, z axis motion 914, gas control 916, a valve assembly or manifold assembly such as, but not limited to, 5-gang gas valve assembly 918, and 2-gang gas valve assembly 920. Moreover, controller 402 can provide power supply control to one or more power supplies used with the cutting or marking operation.

Figure 10:
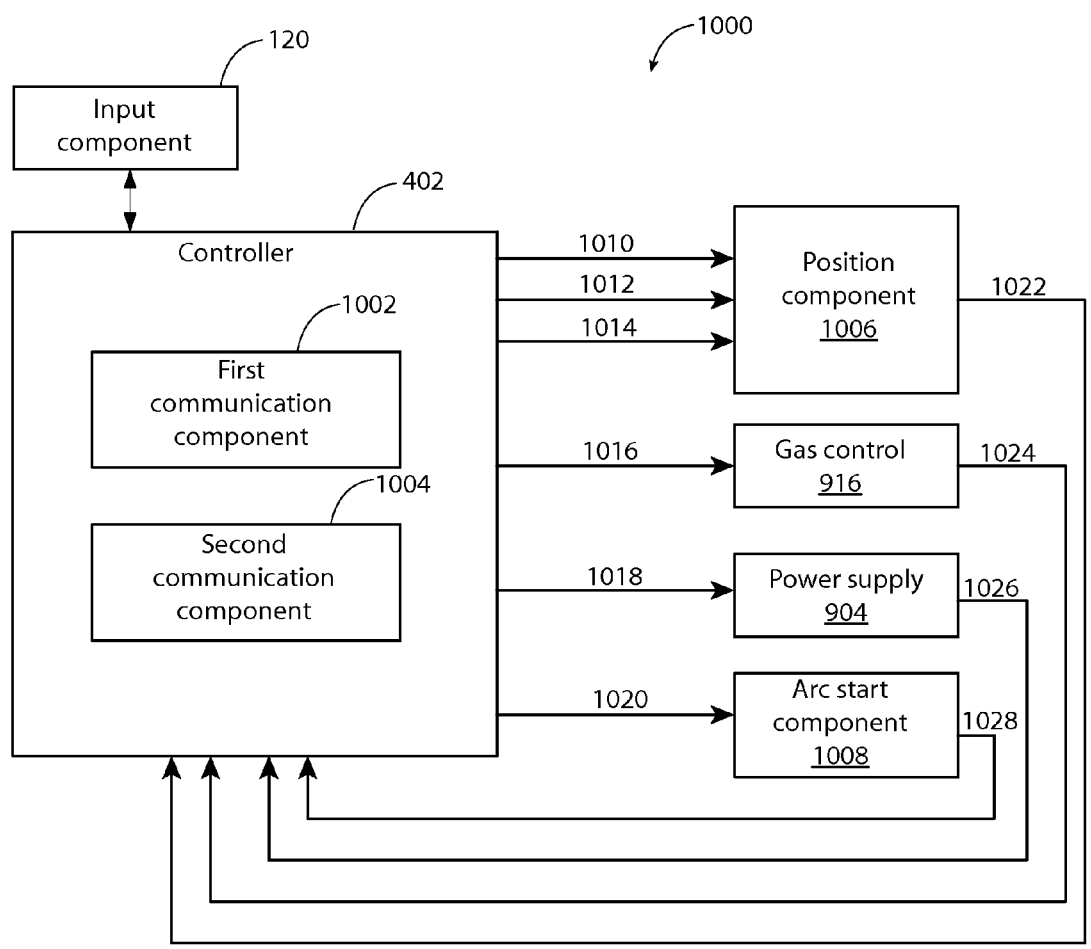
FIG. 10 illustrates a system that generates machine readable instructions from controller to perform a cutting operation with a cutting system.

FIG. 10 illustrates a system 1000 that generates machine readable instructions from controller 402 to perform a cutting operation with a cutting system. System 1000 includes input component 120 (e.g., also referred to as HMI) that can receive a user input related to the cutting or marking operation performed on the workpiece, wherein machine readable instructions are generated by controller 402 for two or more of the following: position component 1006; gas control 916; power supply 904; and arc start component 1008. For example, input component 120 is configured to receive a user input associated with a parameter to perform the operation (e.g., cutting operation, marking operation, and the like). The parameter can be, but is not limited to being, a desired shape profile for the workpiece, a contour for the workpiece, a hole shape for the workpiece, a thickness of the workpiece, a material type of the workpiece, a cutting velocity, a waveform, a voltage, a current, a torch height, and the like. Input component 120 can be a standalone component (as depicted), incorporated into controller 402, incorporated into power supply 904, incorporated into gas control 916, incorporated into arc start component 1008, or a combination thereof. Moreover, input component 120 can communicate data with controller 402 via a wired connection, a wireless connection, or a combination thereof. It is to be appreciated that arc start component 1008 can be a stand-alone component (as depicted), incorporated into power supply 904, or a combination thereof. In other words, power supply 904 can include components to provide arc starting. Use of arc start component 1008 is solely for example and any suitable arc start technique can be selected and used by one of sound engineering judgment and/or ordinary skill without departing from the scope of the subject innovation. For example, arc start can be done with high frequency, impulse start, high end system, contact starting, and the like.

Controller 402 can generate one or more machine readable instructions for use to perform a cutting or marking operation on a workpiece. It is to be appreciated that the one or more machine readable instructions can be, but is not limited to being, a program, a portion of data, a packet of data, a portion of code, a portion of program, an executable, and the like. Controller 402 can communicate data with at least one of position component 1006, gas control 916, power supply 904, arc start component 1008, among others. Data communication from controller 402 can include machine readable instructions that are used by various components (e.g., position component 1006, gas control 916, power supply 904, arc start component 1008, among others) to perform the cutting or marking operation.

As discussed, controller 402 can generate machine readable instructions that are communicated to perform a cutting or marking operation on the workpiece. Controller 402 generates first set of machine readable instructions 1010 that control an x axis motion of the torch with position component 1006. Controller 402 generates second set of machine readable instructions 1012 that control a y axis motion of the torch with position component 1006. Controller 402 generates third set of machine readable instructions 1014 that control a z axis motion of the torch with position component 1006. Controller 402 generates fourth set of machine readable instructions 1016 that control a gas flow from a gas supply (e.g., via gas control 916) of the plasma cutting or marking operation, wherein gas control 916 includes management of a valve assembly such as, but not limited to a 5-gang gas valve assembly for a shield gas, management of a valve assembly such as, but not limited to a 2-gang gas valve assembly for a plasma gas, and a management of a sequence of distribution of the shield gas and the plasma gas and venting of the plasma gas. It is to be appreciated that gas control 916 can control any suitable number of valve assemblies and control of a 2-gang valve assembly and a 5-gang valve assembly is used as a non-limiting example. Controller 402 generates fifth set of machine readable instructions 1020 that control transmission of a single unipolar high voltage impulse to initiate a pilot arc (via arc start component 1008) used with the plasma cutting or marking operation. Controller 402 generates sixth set of machine readable instructions 1018 that control one or more power supply 904. Although one power supply 904 is illustrated, any suitable number of power supplies can be utilized and controlled by machine readable instructions 1018 generated by controller 402.

Controller 402 communicates at least one of first set of machine readable instructions 1010, second set of machine readable instructions 1012, third set of machine readable instructions 1014, fourth set of machine readable instructions 1016, fifth set of machine readable instructions 1020, or sixth set of machine readable instructions 1018, to perform the plasma cutting or marking operation with the torch based on at least the user input.

It is to be appreciated that although position component 1006 is illustrated, that any suitable number of position components can be utilized to provide movement to a torch or implement used with the cutting or marking operation. position component can actuate motion of a torch or implement to perform the cutting operation to achieve the desired workpiece. In an embodiment, there can be any suitable number of position components 1006 to perform axis of motion and/or multiple axis of motion. In a particular embodiment, there can be a first position component to perform x axis motion, a second position component to perform y axis motion, a third position to perform z axis motion, and the like. In another embodiment, position component 1006 can perform x axis motion and y axis motion and a second position component can perform z axis motion. In still another embodiment, position component 1006 can perform x axis motion, y axis motion, and z axis motion.

In addition, controller 402 can receive a feedback signal that can be used by controller 402 to dynamically adjust a parameter or setting related to the cutting or marking operation on the workpiece. For instance, each of at least one of position component 1006, gas control 916, power supply 904, or arc start component 1008 can transmit one or more feedback signal. By way of example and not limitation, a feedback signal for a component used with the cutting or marking operation can be communicated to controller 402, wherein controller 402 uses such feedback signal to dynamically adjust the cutting or marking operation (e.g., based on a change of a parameter, a setting, among others). It is to be further appreciated that one or more feedback signals can be requested by controller 402. In another embodiment, one or more feedback signals can be periodically communicated to controller 402 based on a duration of time or an event that occurs with the cutting or marking operation. In general, one or more feedback signals can be communicated to controller 402 to allow adjustment of a parameter or a setting associated with the cutting or marking operation in real time.

For instance, position control component 1006 can communicate one or more feedback signals 1022 related to at least motion or location such as, but not limited to, at least one of x axis motion, y axis motion, or z axis motion. In another embodiment, position control component 1006 can communicate a feedback signal for each axis of motion. One or more feedback signals 1022 can include data related to a position or location (e.g., in an x axis, a y axis, or a z axis) of a torch used with the cutting or marking operation. One or more feedback signals 1022 can be received by controller 402 to be used with dynamic control of the cutting or marking operation.

In another example, gas control 916 can communicate one or more feedback signals 1024 related to management of gas supply to perform the cutting or marking operation. For instance, one or more feedback signals 1024 can be related to a valve assembly, a gas valve assembly, a manifold assembly, an assembly, a 2-gang valve assembly, a 5-gang valve assembly, a supply of gas, a pressure level of a gas, a flow rate of a gas, a pressure transducer, a solenoid valve, a proportional valve, a temperature of a gas, a sequence of gas delivery, an amount of time a gas is delivered, an amount of gas that is delivered, among others. One or more feedback signals 1024 can be received by controller 402 to be used with dynamic control of the cutting or marking operation.

In still another example, power supply 904 can communicate one or more feedback signals 1026 related to one or more power supplies. For instance, one or more feedback signals 1026 can be a voltage, a current, a power output, a wattage, a fault condition, an error code, an alert, a notification, among others. One or more feedback signals 1026 can be received by controller 402 to be used with dynamic control of the cutting or marking operation.

In yet another example, arc start component 1008 can communicate one or more feedback signals 1028 related to a parameter associated with arc ignition for the cutting or marking operation. For instance, one or more feedback signals 1028 can relate to a waveform, a voltage, a unipolar high voltage impulse, an arc, a parameter of the arc, a duration of time for ignition, among others. One or more feedback signals 1028 can be received by controller 402 to be used with dynamic control of the cutting or marking operation.

Upon receipt of at least one of the one or more feedback signals 1022, 1024, 1026, 1028, controller 402 can generate an additional machine readable instruction to adjust the cutting operation based on an evaluation of such one or more feedback signals 1022, 1024, 1026, 1028. For instance, one or more feedback signals 1022, 1024, 1026, 1028 can be compared to a respective threshold and if not within the respective threshold, the additional machine readable instruction can be used with at least one of position component 1006, gas control 916, power supply 904, arc start component 1008, among others to compensate accordingly.

Controller 402 can include first communication component 1002 and second communication component 1004 to handle receiving and/or transmitting data. It is to be appreciated that first communication component 1002 can be incorporated into controller 402 (as depicted), a stand-alone component, or a combination thereof. It is also to be appreciated that second communication component 1004 can be incorporated into controller 402 (as depicted), a stand-alone component, or a combination thereof. First communication component 1002 can be configured to receive data for controller 402, wherein such data can be a feedback signal, a control signal, an alert, a notification, a data packet, a user input, among others. Second communication component 1004 can be configured to transmit data from controller 402 to at least one of position component 1006, gas control 916, power supply 904, arc start component 1008, among others. It is to be appreciated that although first communication component 1002 is described as handling receiving data for controller 402 and second communication component 1004 is described as handling transmitting data from controller 402, that a single communication component can be utilized with the subject innovation. In general, controller 402 can include any suitable number of communication components to handle transmitting data and/or receiving data and such example is not to be seen as limiting on the subject innovation.

Figure 11:
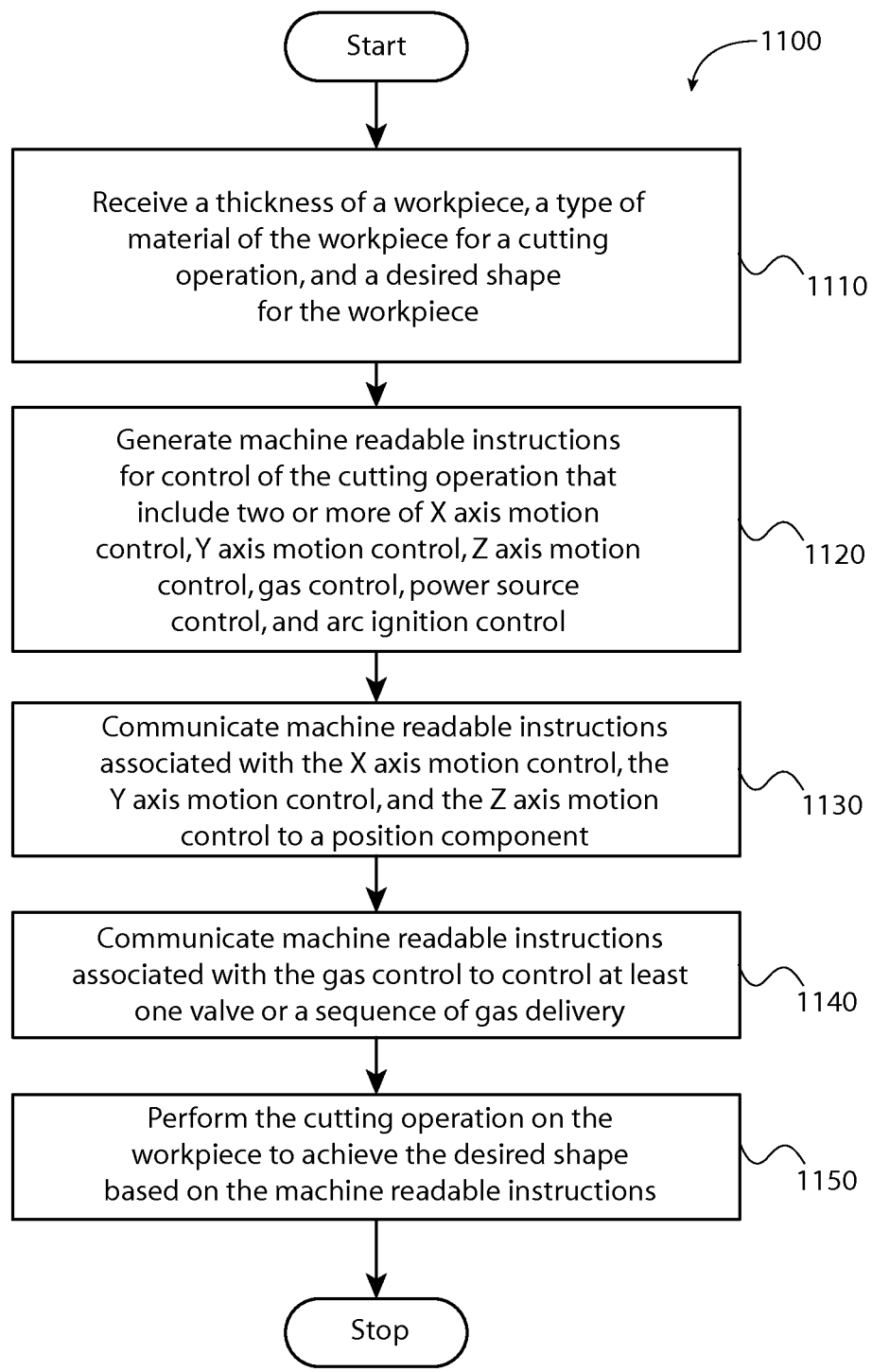
FIG. 11 is a flow diagram of generating machine readable instructions to perform a cutting or marking operation.

FIG. 11 illustrates method 1100 that generates machine readable instructions to perform a cutting or marking operation. As discussed above, the term cutting operation is intended to include a marking operation on a workpiece. In general, the method 1100 can be utilized in which a portion of scrap is removed from a workpiece. Sequentially, the following occurs as illustrated in the decision tree flow diagram 1100 of FIG. 11 which is a flow diagram 1100 that generates machine readable instructions that are used in performing an operation that removes scrap from a workpiece and, in particular, a cutting or marking operation of a workpiece.

A thickness of a workpiece, a type of material of the workpiece for a cutting operation, a start location for the cutting operation, and a desired shape of for the workpiece can be received (reference block 1110). Machine readable instructions that include two or more of x axis motion control, y axis motion control, z axis motion control, gas control, power source control, and arc ignition control for the cutting operation can be generated (reference block 1120).

Machine readable instructions associated with the x axis motion control, y axis motion control, and z axis motion control can be communicated to a position component (reference block 1130). As discussed above, a position component can actuate motion of a torch or implement to perform the cutting operation to achieve the desired workpiece. In an embodiment, there can be any suitable number of position components to perform axis of motion and/or multiple axis of motion. In a particular embodiment, there can be a first position component to perform x axis motion, a second position component to perform y axis motion, a third position to perform z axis motion, and the like. In another embodiment, a position component can perform x axis motion and y axis motion and a second position component can perform z axis motion. In still another embodiment, a position component can perform x axis motion, y axis motion, and z axis motion.

Machine readable instructions associated with gas control can be communicated to control at least one of a valve or a sequence of gas delivery (reference block 1140). For instance, gas delivery can be used to perform the cutting or marking operation and the sequence of delivery can be based on machine readable instructions generated. In another embodiment, machine readable instructions associated with power source control can be communicated to one or more power sources. In still another embodiment, machine readable instructions associated with arc ignition control can be communicated to an arc start component that ignites an arc to perform the cutting or marking operation.

The cutting operation can be performed on the workpiece to achieve the desired shape based on the machine readable instructions generated (reference block 1150). In an embodiment, the machine readable instructions are generated by a controller.

It is to be appreciated that a method, for example, method 1100, can include receiving a feedback signal (e.g., a portion of data, an electronic signal, a packet of data, a digital signal, an analog signal). For instance, the feedback signal can be from at least one of a position component, a gas control, a power source, an arc start component, a valve, an assembly, a valve assembly, a manifold assembly, a 2-gang valve assembly, a 5-gang valve assembly, a pressure transducer, and the like. As discussed above, a feedback signal is data (e.g., a signal, a portion of data, a packet of data, an analog signal, a digital signal, and the like) that is representative of a state or parameter related to the cutting operation or a component that is used to perform the cutting operation or with performing the cutting operation (e.g., a position component, a gas control, a power source, an arc start component, a camera, an image device, a movement sensor, an audio sensor, a light sensor, a voltage sensor, a current sensor, a temperature sensor, a gas flow sensor, a pressure sensor, and the like).

In an embodiment, a feedback signal can be received by a controller, wherein the controller generates the two or more machine readable instructions as discussed above.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components (e.g., HMI, position component, controller, gas control, power supply, arc start component, input component, etc.) are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A system for cutting or marking a workpiece, comprising:
   an implement that performs an operation, wherein the operation is at least one of a cutting of the workpiece or a marking of the workpiece;
   a gantry;
   a table that supports the workpiece;
   a power supply;
   an input component that is configured to receive a user input associated with a parameter to perform the operation;
   a controller that is configured to provide the following:
      a height control for the implement that manages a motion toward the workpiece or away from the workpiece;
      a consumable control for the operation;
      a power control to the power supply for the operation;
      a motion control for the implement that manages a motion about the workpiece; and
      a process control for a sequencing of at least one of the height control, the consumable control, the power control, and the motion control for the operation.

2. The system of claim 1, wherein the operation is at least one a laser operation, a waterjet operation, or a milling operation.

3. The system of claim 1, wherein the operation is a plasma operation.

4. The system of claim 3, wherein the consumable control for the operation is gas selection and the process control includes a sequencing of at least one of a gas, a current, or a voltage.

5. The system of claim 3, wherein the process control includes a sequence of the height control and the motion control.

6. The system of claim 3, further comprising:
   the height control is a set of machine readable instructions for a drive that controls a motion in a z axis;
   the consumable control is a set of machine readable instructions for at least one of a pressure transducer, a proportional valve, or a solenoid valve related to a gas selection for the operation;
   the power control is a set of machine readable instructions for the power supply;
   the motion control is a set of machine readable instructions for a drive that controls at least one of a motion in an x axis about the workpiece, a motion in a y axis about the workpiece, a travel speed, a lead in, or a lead out;
   the process control includes a set of machine readable instructions for sequencing at least one of a gas used with the operation, a current for the operation, or a voltage of the operation; and
   the controller communicates with the drive that controls the motion in the z axis, the drive that controls the motion in an x axis, the drive that controls the motion in a y axis, and at least one of the pressure transducer, the proportional valve, or the solenoid valve related to the gas selection, wherein the controller communicates without an RS422 Comm.

7. The system of claim 1, wherein the parameter is a desired shape profile for the workpiece or a contour for the workpiece.

8. The system of claim 1, wherein the parameter is at least one of a thickness of the workpiece, or a material type of the workpiece or a cutting velocity.

9. The system of claim 1, the input component is further configured to communicate the user input wirelessly to the controller.

10. The system of claim 9, wherein the input component is incorporated into the power supply.

11. The system of claim 1, wherein the controller is affixed to the gantry.

12. The system of claim 1, the controller further includes at least one of the following:
- a first communication component that receives data for the controller from at least one of a drive that controls a motion in a z axis, a pressure transducer, a proportional valve, a solenoid valve, a drive that controls a motion in an x axis, a drive that controls motions in a y axis, or the power supply of the operation; or
- a second communication component that transmits data from the controller to at least one of a drive that controls a motion in a z axis, a pressure transducer, a proportional valve, a solenoid valve, a drive that controls a motion in an x axis, a drive that controls motions in a y axis, or the power supply of the operation.

13. The system of claim 12, at least one of the first communication component or the second communication component is at least one of an Ethernet, a serial real time communication system (Sercos), a controller area network (CAN), a network, a LAN, a WLAN, or a wireless network.

14. The system of claim 1, the controller is further configured to generate an updated machine readable instruction for at least one of the height control, the consumable control, the motion control, the power control, or the process control, wherein the updated machine readable instruction is based on a dynamic monitoring of the operation.

15. A system that performs a plasma cutting or marking operation on a workpiece, comprising:
- a gantry;
- a torch;
- a table that supports the workpiece;
- an input component that is configured to receive a user input associated with a parameter to perform the plasma cutting or marking operation, wherein the parameter is at least one of a desired shape profile for the workpiece, a thickness of the workpiece, a material type of the workpiece, or a cutting velocity;
- a housing that includes a controller;
- the controller generates a first set of machine readable instructions that control an x axis motion of the torch with a position component;
- the controller generates a second set of machine readable instructions that control a y axis motion of the torch with the position component;
- the controller generates a third set of machine readable instructions that control a z axis motion of the torch with the position component;
- the controller generates a fourth set of machine readable instructions that control a gas flow from a gas supply of the plasma cutting or marking operation, wherein the gas control includes management of a gas valve assembly for a shield gas, management of a gas valve assembly for a plasma gas, and a management of a sequence of distribution of the shield gas and the plasma gas and venting of the plasma gas; and
- the controller communicates at least one of the first set of machine readable instructions, the first set of machine readable instructions, the second set of machine readable instructions, the third set of machine readable instructions, or the fourth set of machine readable instructions to perform the plasma cutting or marking operation with the torch based on the parameter.

16. The system of claim 15, wherein the controller receives a feedback signal of the plasma cutting or marking operation and dynamically adjusts a setting of the plasma cutting or marking operation, wherein the setting is at least one of a current, a voltage, a height of the torch, the gas flow from the gas supply, or a sequence of one or more gases from the gas supply.

17. The system of claim 15, wherein the controller generates a fifth set of machine readable instructions that control transmission of a single unipolar high voltage impulse to initiate a pilot arc used with the plasma cutting or marking operation.

18. The system of claim 15, further comprising:
- at least one power supply that supplies a portion of power for the plasma cutting or marking operation, wherein the controller communicates with the at least one power supply with a deterministic communication protocol; and
- the controller generates an additional set of machine readable instructions that control a supply of from the at least one power supply.

19. The system of claim 15, wherein the input component is further configured to communicate the user input wirelessly to the controller.

20. A system that performs a plasma cutting or marking operation on a workpiece, comprising:
- a workpiece;
- a gantry;
- a torch;
- a table that supports the workpiece;
- means for receiving a user input associated with a parameter to perform the plasma cutting or marking operation, wherein the parameter is at least one of a desired shape profile for the workpiece, a thickness of the workpiece, a material type of the workpiece, or a cutting velocity;
- a housing that includes a controller;
- the controller generates a first set of machine readable instructions that control an x axis motion of the torch with a position component;
- the controller generates a second set of machine readable instructions that control a y axis motion of the torch with the position component;
- the controller generates a third set of machine readable instructions that control a z axis motion of the torch with the position component;
- the controller generates a fourth set of machine readable instructions that control a gas flow from a gas supply of the plasma cutting or marking operation, wherein the gas control includes management of a gas valve assembly for a shield gas, management of a gas valve assembly for a plasma gas, and a management of a sequence of distribution of the shield gas and the plasma gas and venting of the plasma gas; and
- means for communicating at least one of the first set of machine readable instructions, the first set of machine readable instructions, the second set of machine readable instructions, the third set of machine readable instructions, or the fourth set of machine readable instructions to perform the plasma cutting or marking operation with the torch based on the parameter.

21. A system that performs a plasma cutting or marking operation on a workpiece, comprising:
- a gantry;
- a torch;
- a table that supports the workpiece;
- means for receiving a user input associated with a parameter to perform the plasma cutting or marking operation, wherein the parameter is at least one of a desired shape profile for the workpiece, a thickness of the workpiece, a material type of the workpiece, or a cutting velocity;

a housing that includes a controller;

the controller generates a first set of machine readable instructions that control an x axis motion of the torch with a position component;

the controller generates a second set of machine readable instructions that control a y axis motion of the torch with the position component;

the controller generates a third set of machine readable instructions that control a z axis motion of the torch with the position component;

the controller generates a fourth set of machine readable instructions that control a gas flow from a gas supply of the plasma cutting or marking operation, wherein the gas control includes management of a gas valve assembly for a shield gas, management of a gas valve assembly for a plasma gas, and a management of a sequence of distribution of the shield gas and the plasma gas and venting of the plasma gas; and means for communicating at least one of the first set of machine readable instructions, the first set of machine readable instructions, the second set of machine readable instructions, the third set of machine readable instructions, or the fourth set of machine readable instructions to perform the plasma cutting or marking operation with the torch based on the parameter.

* * * * *